(12) United States Patent
Moretz

(10) Patent No.: US 6,764,103 B1
(45) Date of Patent: Jul. 20, 2004

(54) METHOD AND APPARATUS FOR LOCKING A TUBULAR QUICK COUPLING

(76) Inventor: Benny W. Moretz, P.O. Box 805667, Lafayette, LA (US) 70598

( * ) Notice: Subject to any disclaimer, the term of this patent is extended or adjusted under 35 U.S.C. 154(b) by 0 days.

(21) Appl. No.: 10/397,870

(22) Filed: Mar. 25, 2003

(51) Int. Cl.$^7$ .......................... E21B 47/024; F16L 55/00
(52) U.S. Cl. ........................... 285/81; 285/89; 285/361; 285/402; 166/84
(58) Field of Search ........................... 285/81, 89, 361, 285/360, 376, 377, 396, 402; 166/84

(56) References Cited

U.S. PATENT DOCUMENTS

| | | | | |
|---|---|---|---|---|
| 20,532 A | * | 6/1858 | Woerd | 285/88 |
| 199,312 A | * | 1/1878 | Perkins | 285/89 |
| 554,666 A | * | 2/1896 | Feltner | 285/85 |
| 643,358 A | * | 2/1900 | Konold | 285/85 |
| 692,795 A | * | 2/1902 | Moyle | 285/81 |
| 1,596,645 A | * | 8/1926 | Whatley | 285/82 |
| 2,165,163 A | * | 7/1939 | Waters | 285/91 |
| 2,673,751 A | * | 3/1954 | Finch | 285/84 |
| 3,145,995 A | * | 8/1964 | Adamson et al. | 166/53 |
| 3,309,113 A | * | 3/1967 | Beach | 285/7 |
| 3,480,300 A | * | 11/1969 | Teague et al. | 285/93 |
| 3,762,725 A | | 10/1973 | Taylor | |
| 4,076,285 A | * | 2/1978 | Martinez | 285/332 |
| 4,090,573 A | * | 5/1978 | Rankin | 175/45 |
| 4,386,783 A | * | 6/1983 | Davis | 277/330 |
| 4,442,859 A | * | 4/1984 | Gentry | 137/242 |
| 4,632,433 A | * | 12/1986 | Kimura | 285/38 |
| 4,667,987 A | * | 5/1987 | Knebel | 285/124.4 |
| 4,899,816 A | * | 2/1990 | Mine | 166/85.5 |
| 4,913,471 A | * | 4/1990 | Huneke | 285/281 |
| 5,188,173 A | * | 2/1993 | Richardson et al. | 166/77.1 |
| 6,231,083 B1 | * | 5/2001 | Marandi | 285/5 |
| 6,422,607 B1 | * | 7/2002 | Kirby | 285/81 |

\* cited by examiner

Primary Examiner—Eric K. Nicholson
(74) Attorney, Agent, or Firm—Robert N. Montgomery

(57) ABSTRACT

A heavy duty, locked, tubular quick coupling used for coupling oil and gas well tubing or pipe joints, thus allowing long strings of pipe and tube joints subsequently connected to at least one such quick coupled joint to be lifted as a string, thereby applying tensile loading to the quick coupled joints. Both interior and exterior locking arrangements for the locked quick coupling are disclosed which utilize twist-locking elements secured in position by a locking washer and cap nut. Arrangements are also disclosed illustrating how the locking couplings are used for fast setup of wire-line riser strings utilizing multiple specialty subs and valve assemblies.

17 Claims, 7 Drawing Sheets

US 6,764,103 B1

METHOD AND APPARATUS FOR LOCKING A TUBULAR QUICK COUPLING

01) FIELD OF THE INVENTION

This invention relates generally to tubular unions or quick coupling fittings used to assemble temporary tube and pipe assemblies and more particularly to the assembly of heavy tubular connections used for oil and gas well operations relating to wire-line wellhead set-ups that require lifting of the wellhead tubular riser while being attached to a down hole tubular string without removing or otherwise disturbing the wire-line cable located within the tubular string.

02) GENERAL BACKGROUND

Tubular connection joints are generally made in several ways, i.e. welded, threaded, or flanged. Although each such connection joint may be considered as temporary due to the fact that the joints may be cut, unscrewed or unbolted, tubular joint connections that require frequent disassembly or orientation of the coupled members after assembly often resort to union type fittings. Such fittings provide some type of coupling member attached to each of the tubular members being joined, one or both of the coupling members having a sealing means, and the coupling members joined by a single threaded nut or collar member. This arrangement permits each tubular member to be rotated relative to its joining member and allows for a fast assembly or disassembly by simply rotating the single nut. The arrangement works well in most cases where there is no tensile loading placed on the joint. If a pulling force is placed on the joint, the threaded nut or collar securing the joint coupling members together most likely will fail since the load is applied directly to the threads. When setting up wire-line tubular risers connected to a wellhead in a manner known within the art as a free point riser set-up, whereby the riser is connected to the down hole tubing string, quick couplings or unions such Bowen™ (trademark registered to Bowen Tool Corp.) type fittings may not be used, thereby requiring extensive setup time using threaded or flanged connections between tubular joints, valves etc.

03) SUMMARY OF THE INVENTION

This invention relates to a heavy, tubular, quick coupling used on oil and gas well tubing or pipe joints for allowing long strings of pipe, subsequently connected to quick coupled joints, to be lifted as a string, thereby applying tensile loading on the quick coupled joints. Both interior and exterior locking arrangements are disclosed that utilize twist-locking elements secured in position by a locking washer and cap nut. Arrangements also are disclosed illustrating how the locking coupling is used for fast setup of wire-line riser strings and utilizing multiple valve assemblies.

04) BRIEF DESCRIPTION OF THE DRAWINGS

For a further understanding of the nature and objects of the present invention, reference should be made to the following detailed description taken in conjunction with the accompanying drawings, in which, like parts are given like reference numerals, and wherein.

05) DETAILED DESCRIPTION OF THE PREFERRED EMBODIMENT

Figure 1:
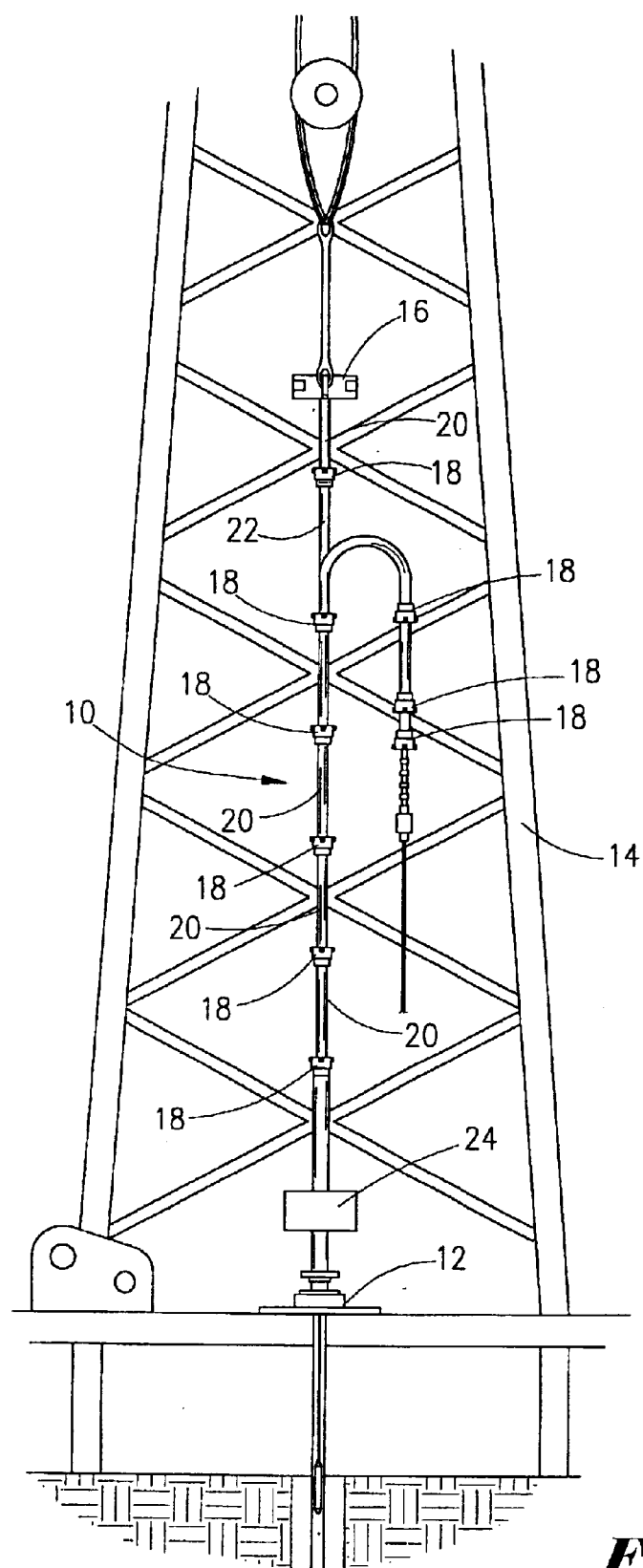
FIG. 1 is an elevation view of a wire-line tubular riser assembly within a derrick.
Figure 2:
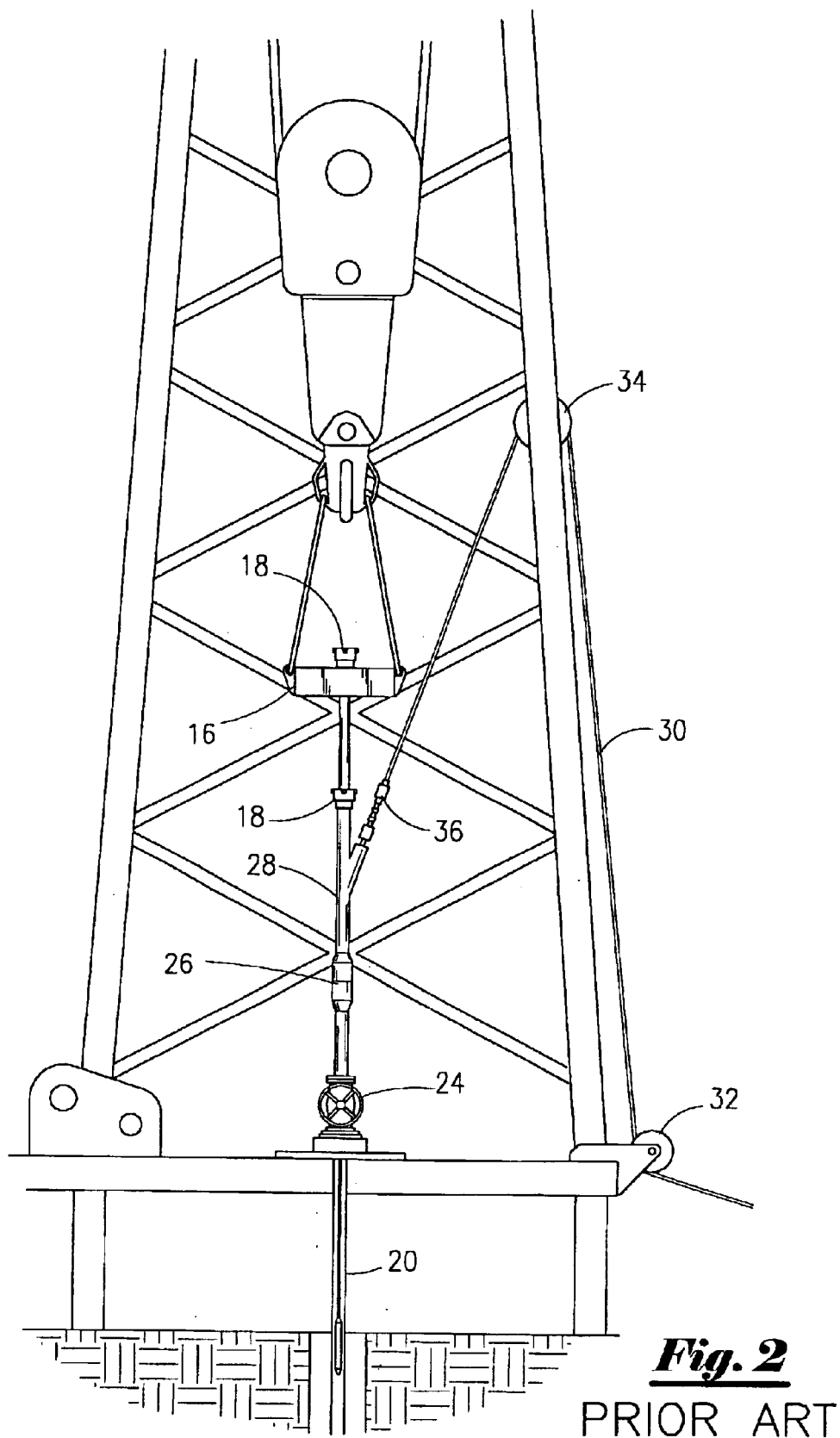
FIG. 2 is an elevation view of a prior art wire-line tubular riser assembly.

05a) As may be seen in FIG. 1, one application for utilizing the Locking Quick Coupling (LQC) is a wire-line riser assembly 10 that may be attached to a wellhead 12 with or without a derrick 14. The riser assembly 10 may be supported by the derrick 14 elevator 16 or simply by a crane (not shown). Heavy quick couplings or unions 18 of a type well established within the art as having a threaded receiving member, a threaded nut rotatable about an insertion member with a sealing element cooperative with the receiving member are frequently used for connecting the tubular joints 20, as well as special radial conveyor sub-sections 22, valves 24, etc., used within the setup of riser assembly 10. Such elements may be changed frequently throughout wire-line well operations. Special subsections 22 as seen here may be a pressureable internal cable conveyor useful in reducing the overall height of the wire-line riser setup. As can be seen here, making up such riser assemblies 10 is very difficult when being done by hand at great heights. Utilizing quick couplings 18 is essential to the efficient assembly of such riser assemblies 10. However, when such riser assemblies 10 are connected for use in a free point wire-line operation as seen in FIG. 2, the riser assembly may include special wire-line special "Y" subsections 28 and threaded connection 26, as well as valves 24, all connected to subsequent tubular joints 20 extending down hole. In this case the wire-line cable 30 is fed from a cable reel (shown In FIG. 10) through the deck sheave 32 to an intermediate sheave 34 and to a grease head 36 before entering the "Y" subsection 28. This arrangement allows the riser assembly and its subsequent down hole tubular joints 20 to be lifted by the elevator 16 or a crane cable (not shown) in a manner whereby the wire-line cable 30 remains stable and the riser and down hole tubular joints 20 are raised or lowered to free stuck joints down hole. The weight of the down hole tubular joints 20 in many cases is simply too much for the quick couplings 18 that depend on the threads within the coupling nut for support of any load. Therefore, it is advantageous to use one of the coupling assemblies 38, 40 shown in FIGS. 3 and 4 in place of the quick couplings 18 seen in FIGS. 1 & 2 for sustained tensile loading.

Figure 3:
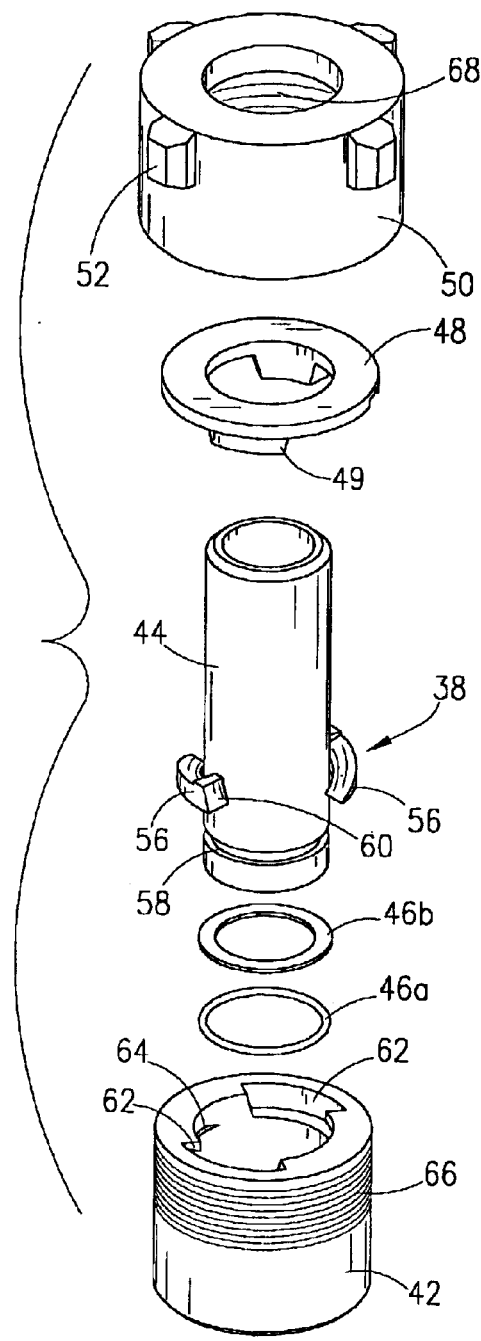
FIG. 3 is and expanded isometric view of the first embodiment of the locking coupling.
Figures 5, 6, 7:
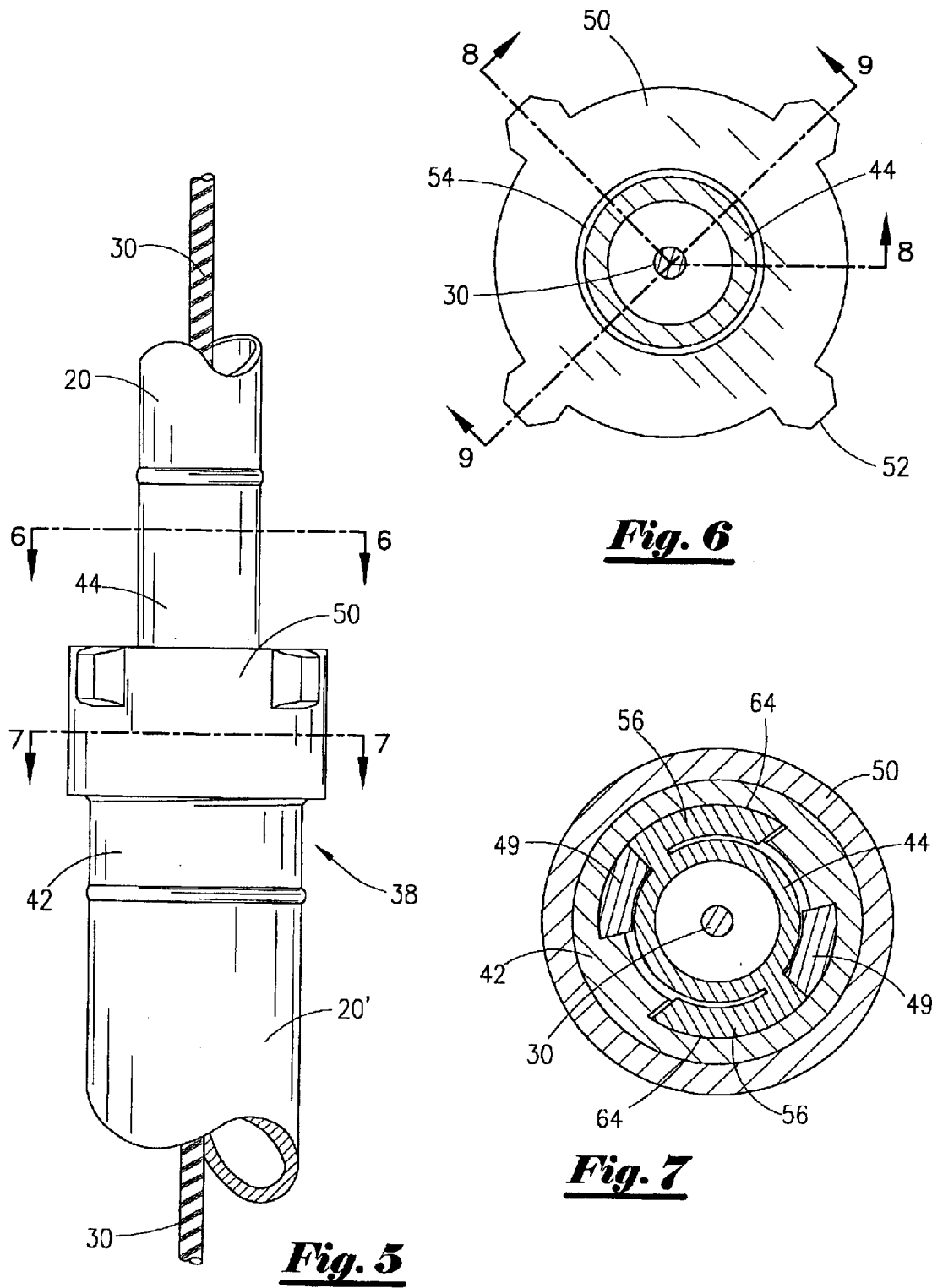
FIG. 5 is an assembled view of the coupling seen in FIG. 3.
FIG. 6 is a horizontal cross section view taken along sight lines 6—6 seen in FIG. 5.
FIG. 7 is a horizontal cross section view taken along sight lines 7—7 seen in FIG. 5.

05b) Looking now at FIG. 3 we see that the first embodiment of the LQC assembly 38 includes a first tubular receiver member 42, an insertion member 44, including seal members 46a, 46b, a locking washer 48 having wedged shaped, curved tangs 49, and a retaining nut 50. As seen in FIG. 5, the LQC 38 assembly is welded or otherwise adapted to connecting tubular members 20, 20' that may be of different sizes and include reducers, etc. A wire-line cable 30 may be passed axially through the LQC 38 and the adjoining tubular members 20,20'. The nut 50 shown in FIG. 6 is provided with external spurs or hammer ears 52 to facilitate loosening and tightening the nut under adverse conditions, such as when coated with oil and grease. It should be noted that a clearance space 54 is provided between the nut 50 and the insertion member 44.

05c) Returning to FIG. 3 it can be seen that the insertion member 44 includes at least two external, wedge-shaped or tapered, curved dogs 56 and an O-ring groove 58 located at the leading end of the insertion member 44 for receiving the seal members 46a, 46b composed of an O-ring 46a and a backup ring 46b. The dogs 56 have beveled heels 60. The tubular receiver 42 further includes internal notches 62 for receiving the dogs 56, locking grooves 64, better seen in FIG. 7, and external threads 66 cooperative with the threads 68 within the retaining nut 50. As seen in FIG. 7, the dogs 56 are rotated in the internal locking grooves 64 by rotating the insertion member 44 and retained in position by tangs 49.

Figure 8:
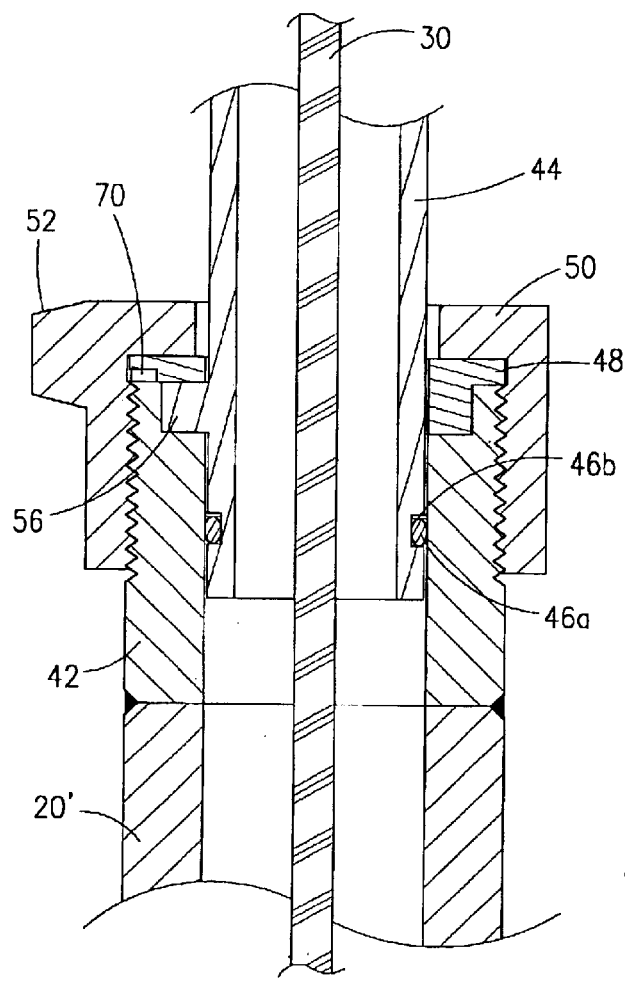
FIG. 8 is a vertical cross section view taken along sight lines 8—8 seen in FIG. 6.
Figure 9:
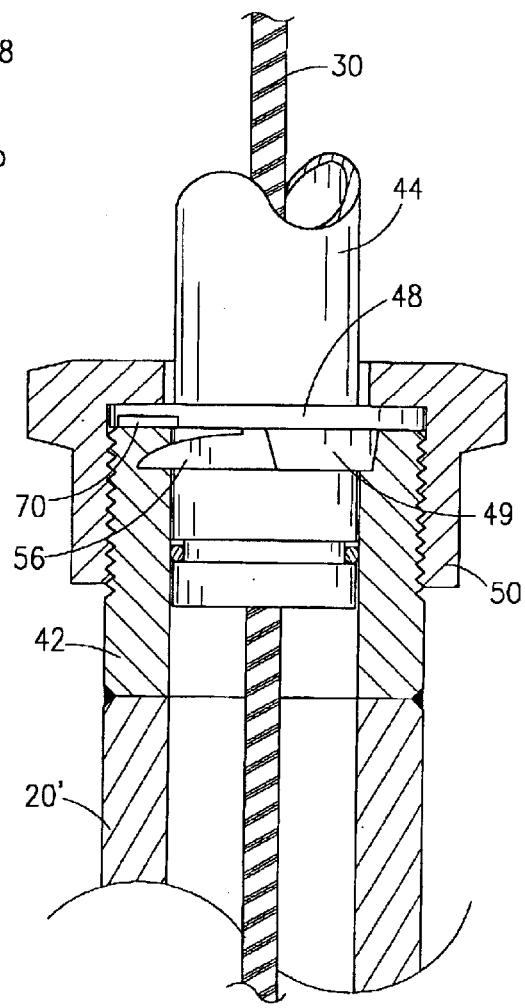
FIG. 9 is a vertical cross section view taken along sight lines 9—9 seen in FIG. 6.

05d) Looking now at FIG. 8 we see that once the insertion member 44 engages the receiver member 42 a seal is made between the outside diameter of the insertion member 44 and the inside diameter or wall of the receiver member 42 maintained by the seal members 46a, 46b. Insertion of the insertion member 44 within the receiver 42 allows the dogs 56 to be interposed within the notches 62 as seen in FIG. 3. Rotation of the insertion member 44 engages the wedge-shaped or tapered, curved dogs 56 with the wedge-shaped internal groove 64 shown in FIG. 7 in a manner whereby continued rotation of the insertion member 44 serves to increase engagement of the two members 42, 44. Additional rotation of the insertion member 44 is achieved upon assembly as a result of engagement of the locking washer 48 and its wedged shaped tangs 49, seen in FIG. 7, with the beveled heel 60 of the wedge-shaped or tapered, curved dogs 56. Compression of the washer 48 by retaining nut 50 as seen in FIG. 9 locks the member 42, 44 in the position seen in FIG. 7. It should be noted that the locking washer 48 is provided with a notch 70, seen in FIG. 8, to be used for prying the washer 48 from the internal receiver notches 62 seen in FIG. 3.

Figure 4:
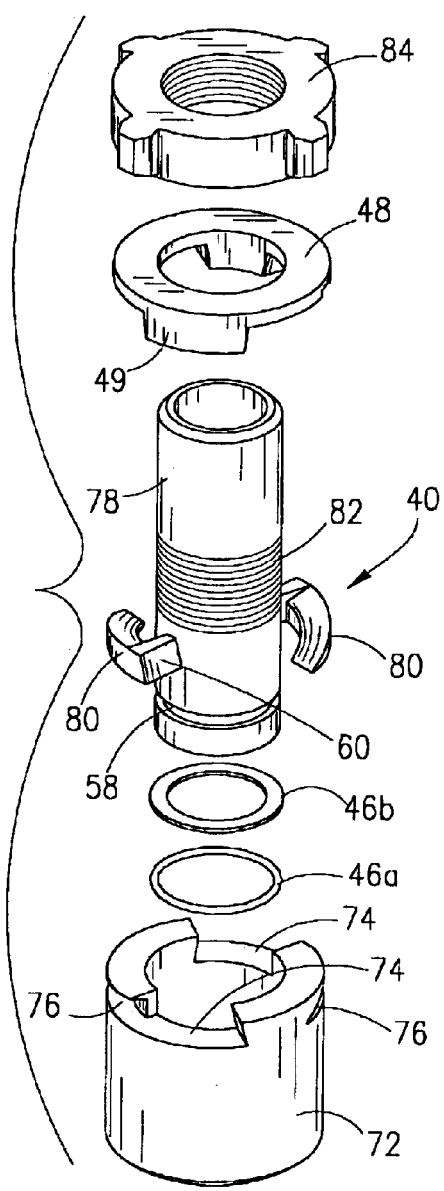
FIG. 4 is and expanded isometric view of the second t embodiment of the locking coupling.

05e) Turning now to FIG. 4, we see a second embodiment of the LQC 40. In this embodiment we have a receiver member 72 having dog receiving notches 74 and external locking grooves 76, seal members 46a, 46b, an insertion member 78 having extended wedged and beveled dogs 80, external threads 82 located along the receiver's body, a locking washer 48, and a locking nut 84. In this case the locking dogs 80 extend further outwardly from the body of the insertion member 78 than the dogs shown in FIG. 3 in a manner so as to engage external grooves 76 in the receiver 72 in an interlocking manner. The threaded nut 84 engages the external threads 82 with the locking washer 48 inserted between the locking nut 84 and the locking dogs 80, thereby forcing the wedged shaped tangs 49 into the receiving notches 74 and into contact with the beveled heel 60 of the wedged-shaped, curved dogs 80 thus further rotating the insertion member 78 into the external locking grooves 76.

Figure 10:
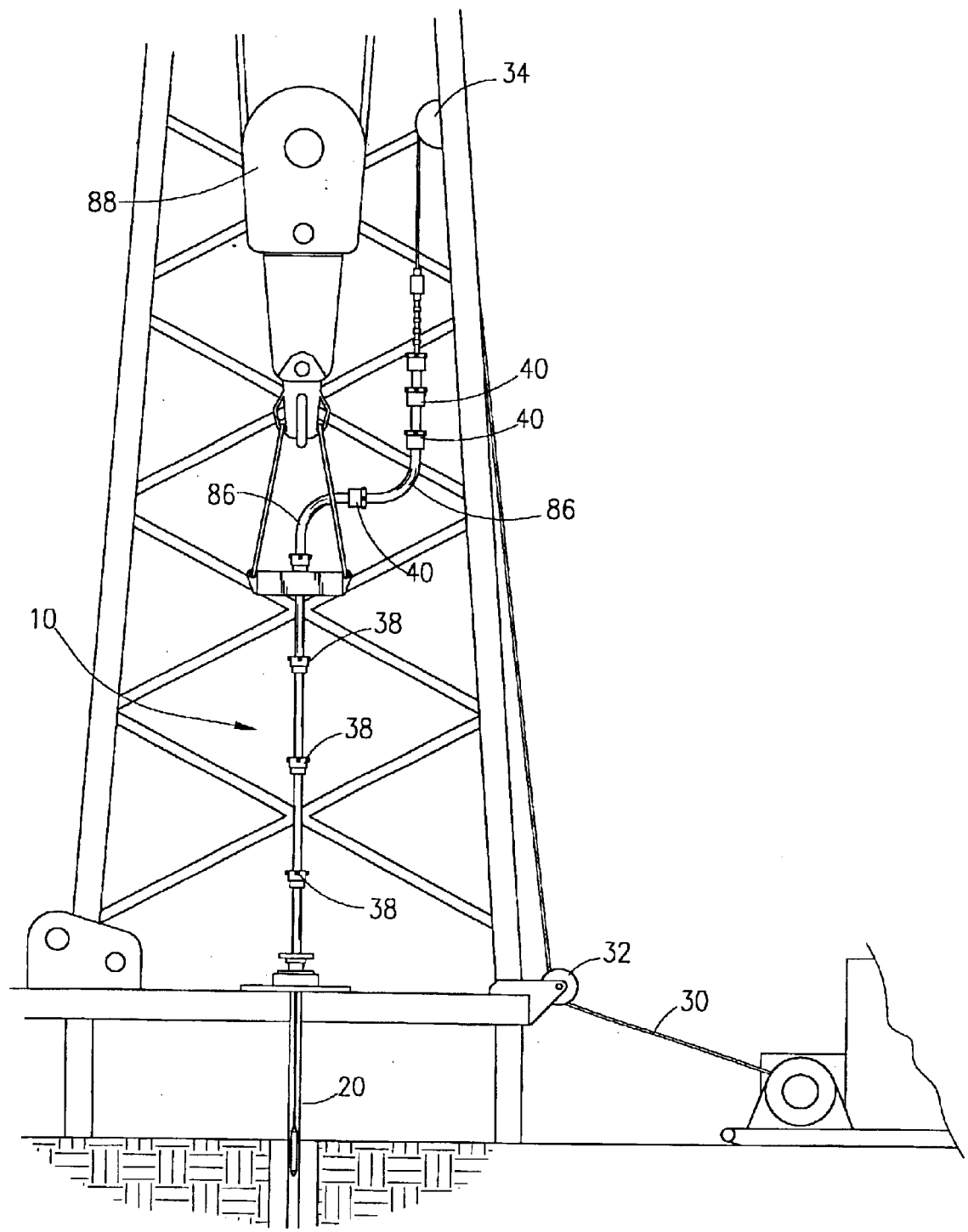
FIG. 10 is an elevation view of a wire-line tubular riser assembly within a derrick utilizing the preferred embodiment.

05f) These locking quick couplings 38, 40 are especially useful in wire-line free-point riser setups such as that seen in FIG. 10 in which a pair of wire-line cable, radial conveyor subs 86 are used to avoid the traveling block 88 when lifting the riser assemblies 10, 20.

Figure 11:
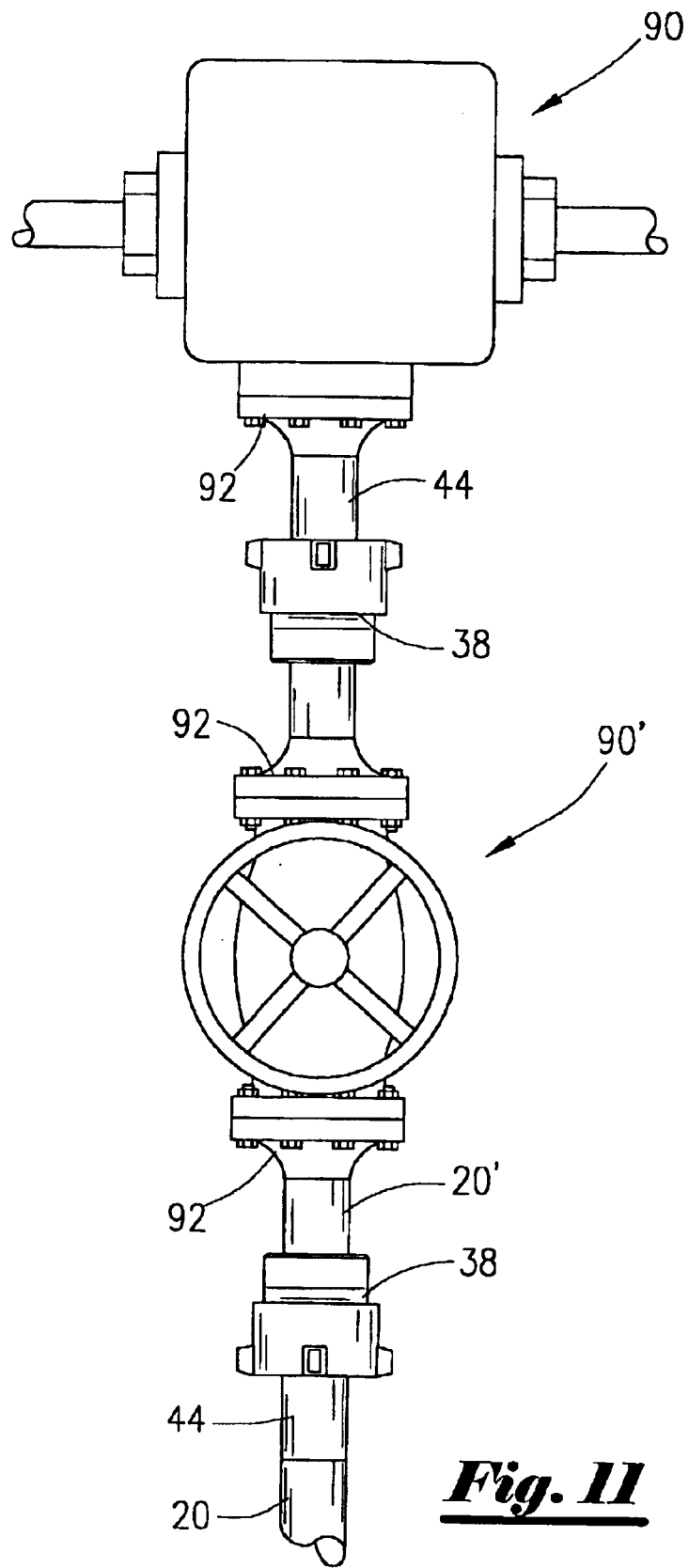
FIG. 11 is an elevation view of the preferred embodiment in use with valve assemblies.

05g) In addition either of the LQCs 38 or 40 (seen in FIGS. 3 & 4) are particularly useful in making connection to valve assemblies 90, 90' as shown in FIG. 11 and may be adapted at either end to pipe flange fittings 92 or a combination of flange fitting 92 at one end and a tubular member at the other.

05h) Because many varying and different embodiments may be made within the scope of the inventive concept herein taught, and because many modifications may be made in the embodiments herein detailed in accordance with the descriptive requirement of the law, it is to be understood that the details herein are to be interpreted as illustrative and not in any limiting sense.

What is claimed is:

1. A locking quick coupling for heavy tubular connections comprising:
   a) an elongated tubular insertion member having external curved tapered dogs and a sealing means at a leading end;
   b) an elongated tubular receiving member for mating with said insertion member having external threads and internal notches and locking grooves therein adjacent one end for receiving said dogs;
   c) a locking washer having wedge-shaped tangs perpendicular to said washer slidable upon said insertion member; and
   d) a locking nut having internal threads cooperative with said external threads located upon said receiving member slidable upon said insertion member.

2. The locking quick coupling according to claim 1 wherein said sealing means is an O-ring located in an external groove at the leading end of said insertion member.

3. The locking quick coupling according to claim 1 wherein a portion of an external surface of said insertion member is slidable within a mating portion of said receiving member and said sealing means maintains a pressure seal between said insertion member and said receiving member.

4. The locking quick coupling according to claim 1 wherein said dogs slidably engage said notches and rotatably engage said internal grooves within said receiver member.

5. The locking quick coupling according to claim 4 wherein said wedge-shaped tangs engage said dogs within said internal notches in a manner whereby compression of said locking washer tends to rotate said dogs.

6. The locking quick coupling according to claim 1 wherein said locking nut captures and compresses said locking washer relative to said receiving member.

7. A locking quick coupling for heavy tubular connections comprising:
   a) an elongated tubular insertion member having an external sealing means located adjacent a leading end, external curved tapered dogs and external threads located adjacent said dogs opposite said leading end;
   b) an elongated tubular receiving member for mating with said insertion member having receiving notches and external locking grooves therein adjacent one end for receiving said dogs;
   c) a locking washer having wedge-shaped tangs perpendicular to said washer slidable upon said insertion member; and
   d) a locking nut having internal threads cooperative with said external threads located upon said insertion member slidable upon said insertion member.

8. The locking quick coupling according to claim 7 wherein said sealing means is an O-ring located in an external groove at the leading end of said insertion member.

9. The locking quick coupling according to claim 7 wherein said sealing means maintains a seal between an exterior of said insertion member and an inside surface of said receiving member.

10. The locking quick coupling according to claim 7 wherein said dogs slidably engage said notches and rotatably engage said internal grooves in said receiver member.

11. The locking quick coupling according to claim 10 wherein said wedge-shaped tangs engage said dogs within said notches in a manner whereby compression of said locking washer tends to rotate said dogs.

12. The locking quick coupling according to claim 7 wherein said locking nut compresses said locking washer relative to said receiving member.

13. A method for quick coupling a tubular wire-line riser assembly including tubular joints, special sub joints and valves potentially connectable to a plurality of down-hole tubular joints in a manner whereby said riser assembly and down hole tubular joints may be lifted as a combined unit whenever necessary comprising the steps of:

a) incorporating at least one tubular locking quick coupling comprising an elongated tubular insertion member having external curved tapered dogs and a sealing means at a leading end, an elongated tubular receiving member for mating with said insertion member having external threads and internal notches and grooves therein adjacent one end for receiving said dogs, a locking washer having wedge-shaped tangs perpendicular to said washer slidable upon said insertion member, and a locking nut having internal threads cooperative with said external threads located upon said receiving member slidable upon said insertion member, into at least one of said tubular joints by adapting each free end of said coupling to one end of an adjoining tubular joint;

b) passing a wire-line through said riser assembly including said locking quick coupling and down hole tubular string; and b) lifting said riser assembly containing at least one said locking quick coupling while connected to said down hole tubular string.

14. The method according to claim 13 including the step of adapting each end of said locking quick coupling to flange fittings.

15. A method according to claim 13 including the step of making up tubular joint strings using said tubular locking quick coupling connection capable of sustaining tensile loading from a plurality of tubular members suspended from said quick coupling.

16. The locking quick coupling according to claim 1 wherein said locking nut comprises external hammer ears.

17. The locking quick coupling according to claim 7 wherein said locking nut comprises external hammer ears.

* * * * *